(12) United States Patent
Sato et al.

(10) Patent No.: US 11,989,149 B2
(45) Date of Patent: May 21, 2024

(54) COMMUNICATION DEVICE AND COMMUNICATION SYSTEM WITH STORING AND ERASING FEATURES

(71) Applicant: SEIKO EPSON CORPORATION, Tokyo (JP)

(72) Inventors: Nozomi Sato, Kitahiroshima (JP); Shinya Uema, Sapporo (JP); Daisuke Mima, Sapporo (JP); Akihiro Tamura, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/941,287

(22) Filed: Sep. 9, 2022

(65) Prior Publication Data

US 2023/0083764 A1 Mar. 16, 2023

(30) Foreign Application Priority Data

Sep. 10, 2021 (JP) .................................. 2021-147397

(51) Int. Cl.
*G06F 13/42* (2006.01)
*G06F 13/40* (2006.01)

(52) U.S. Cl.
CPC .......... *G06F 13/42* (2013.01); *G06F 13/4068* (2013.01)

(58) Field of Classification Search
CPC ............................. G06F 13/42; G06F 13/4068
See application file for complete search history.

(56) References Cited

U.S. PATENT DOCUMENTS

| 7,663,569 | B2 * | 2/2010 | Ono | G09G 5/003 |
| | | | | 709/227 |
| 2006/0208884 | A1 * | 9/2006 | Diamant | G06F 13/4081 |
| | | | | 340/687 |
| 2008/0081614 | A1 * | 4/2008 | Lee | G06F 13/385 |
| | | | | 455/426.1 |
| 2010/0005150 | A1 * | 1/2010 | Kubota | H04L 12/2814 |
| | | | | 709/212 |
| 2014/0078021 | A1 * | 3/2014 | Nakamura | G06F 3/1423 |
| | | | | 345/2.3 |
| 2014/0328313 | A1 | 11/2014 | Merlin et al. | |

FOREIGN PATENT DOCUMENTS

| JP | 2001-168892 A | 6/2001 |
| JP | 2008-090561 A | 4/2008 |
| JP | 2009-72319 A | 4/2009 |
| JP | 2018-142976 A | 9/2018 |

* cited by examiner

*Primary Examiner* — David E Martinez
(74) *Attorney, Agent, or Firm* — Dority & Manning, P.A.

(57) ABSTRACT

A communication device includes a connector inserted into a first device, a communication circuit which performs wireless communication with a second device, and a processing circuit. The processing circuit is programmed to communicate with the first device via the connector to control the communication circuit, wherein the processing circuit is configured to execute generating a first signal representing that the connector is pulled out from the first device when the processing circuit detects that the connector is pulled out from the first device, and transmitting the first signal to the second device by controlling the communication circuit.

5 Claims, 11 Drawing Sheets

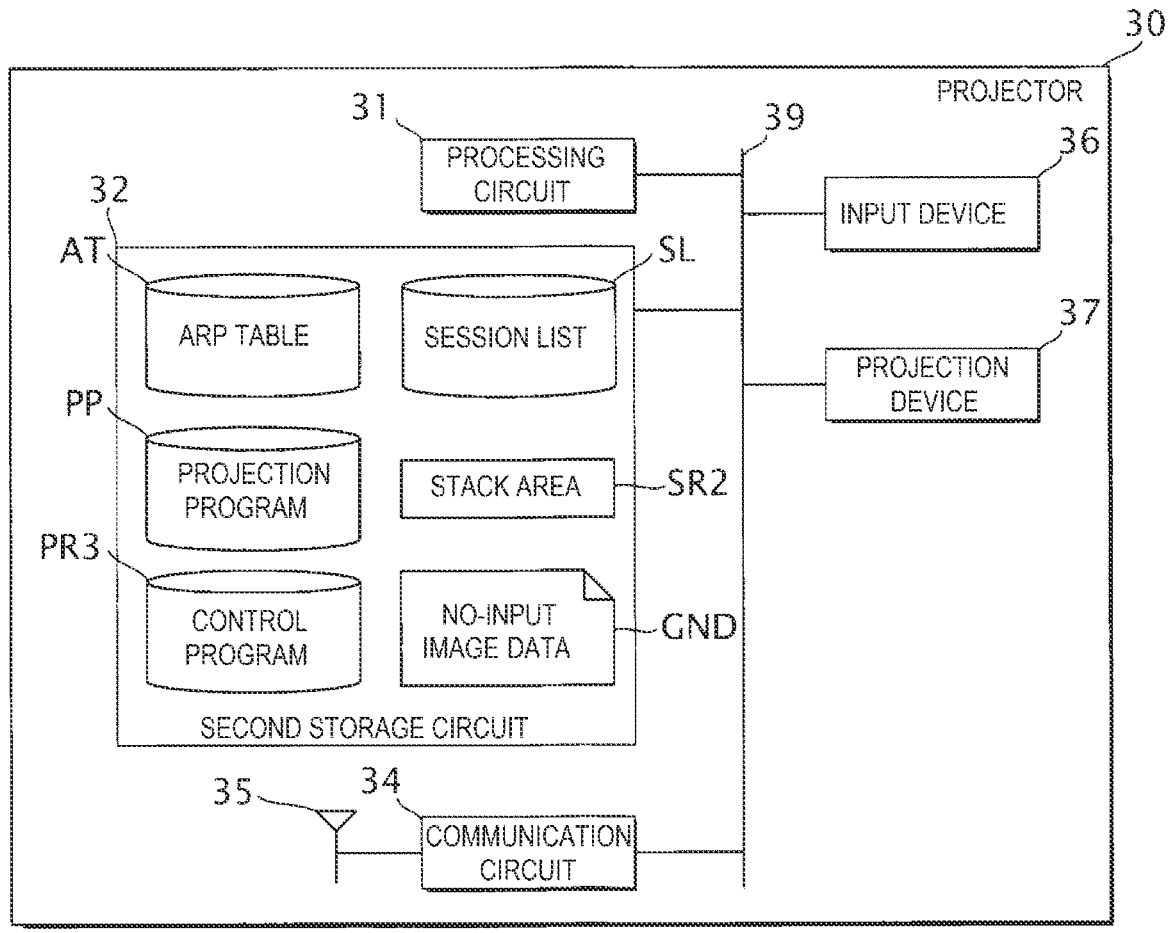

COMMUNICATION DEVICE AND COMMUNICATION SYSTEM WITH STORING AND ERASING FEATURES

The present application is based on, and claims priority from JP Application Serial Number 2021-147397, filed Sep. 10, 2021, the disclosure of which is hereby incorporated by reference herein in its entirety.

BACKGROUND

1. Technical Field

The present disclosure relates to a communication device and communication system.

2. Related Art

It has been in widespread use to insert a communication device capable of performing wireless communication into a first device such as a computer device in order to make the first device and a second device capable of performing wireless communication perform the wireless communication to thereby make the first device and the second device perform the wireless communication via the communication device. For example, in JP-A-2008-090561 (Document 1), there is disclosed an image projection system provided with an image projection device for projecting an image corresponding to image data received by a wireless communicator, a computer device for transmitting the image data to the image projection device, a wireless device functioning as a wireless communicator of the computer device for transmitting the image data with wireless communication. The wireless device has a USB connector. The term USB is an abbreviation for Universal Serial Bus. To the computer device, there is inserted a USB connector for the wireless device.

In Document 1 described above, it is conceivable that transmission of the image data stops when the wireless device is supposedly pulled out from the computer device. Further, in general, even in the state in which the wireless device is kept inserted in the computer device, the transmission of the image data stops temporarily in some cases depending on the state of the wireless communication. There is cited, for example, when a wireless noise is temporality mixed in, and thus, the image data cannot normally be received. The image projection device keeps the establishment of the wireless communication even when the image data cannot be received for a certain period of time, but determines that the wireless communication is disconnected when the period in which the image data cannot be received exceeds the certain period of time. Therefore, in the period from when the reception of the image data stops to when the certain period of time elapses, it is unachievable for the image projection device to distinguish between the fact that the wireless device is pulled out from the computer device and the fact that the transmission of the image data temporarily stops. When the wireless device is pulled out, the image projection device should promptly execute predetermined processing which is executed when the wireless communication is disconnected, there is a problem that the predetermined processing cannot be executed until the certain period of time elapses.

SUMMARY

A communication device according to an aspect of the present disclosure includes a connector to be inserted into a first device, a communication circuit configured to perform wireless communication with a second device, and a processing circuit configured to communicate with the first device via the connector to control the communication circuit, wherein the processing circuit is configured to execute generating a first signal representing that the connector is pulled out from the first device when the processing circuit detects that the connector is pulled out from the first device, and controlling the communication circuit to thereby transmit the first signal to the second device.

A communication system according to an aspect of the present disclosure is a communication system including a first device, a communication device, and a second device, wherein the communication device includes a connector to be inserted into the first device, a communication circuit configured to perform wireless communication with the second device, and a processing circuit configured to communicate with the first device via the connector to control the communication circuit, the processing circuit is configured to execute generating a first signal representing that the connector is pulled out from the first device when it is detected that the connector is pulled out from the first device, and controlling the communication circuit to thereby transmit the first signal to the second device, and the second device executes processing corresponding to the first signal when the second device receives the first signal.

BRIEF DESCRIPTION OF THE DRAWINGS

FIG. 4 is a diagram showing an example of a configuration of a projector 30.

FIG. 5 is a diagram showing an example of a content of an ARP table AT.

FIG. 6 is a diagram showing an example of a content of a session list SL.

DESCRIPTION OF AN EXEMPLARY EMBODIMENT

An embodiment of the present disclosure will hereinafter be described with reference to the drawings. It should be noted that in each of the drawings, the size and the scale of each of the constituents are arbitrarily made different from actual ones. Further, although the embodiment described below is a preferable specific example of the present disclosure, and are therefore provided with a variety of technically preferable limitations, the scope of the present disclosure is not limited to the embodiment unless the description to limit the present disclosure is particularly presented in the following description.

1. First Embodiment

Figure 1:
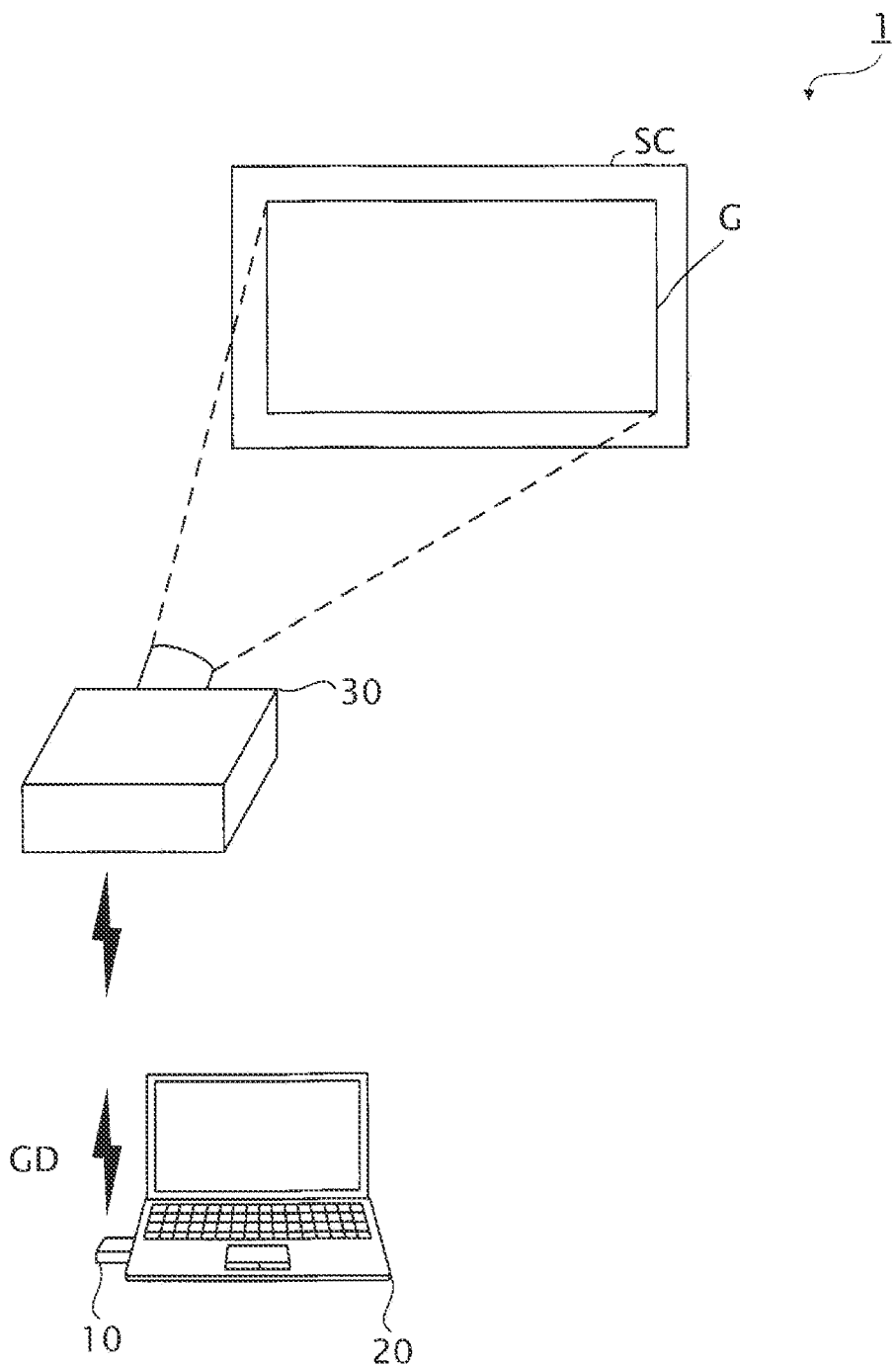
FIG. 1 is a schematic diagram illustrating a communication system 1 according to a first embodiment.

FIG. 1 is a schematic diagram illustrating a communication system 1 according to a first embodiment. The communication system 1 displays an image G on a projection surface SC. The communication system 1 has a communication device 10, a PC 20, and a projector 30. The term PC is an abbreviation for Personal Computer. It should be noted that the PC 20 is an example of a "first device." The projector 30 is an example of a "second device," and at the same time, an example of a "display device." The image G is an example of a "first image."

The communication device 10 is inserted into the PC 20. The PC 20 performs wireless communication with the projector 30 via the communication device 10. The PC 20 transmits image data GD representing the image G to the projector 30 via the communication device 10. The projector 30 projects the image G on the projection surface SC.

In the present embodiment, the PC 20 and the projector 30 performs the wireless communication with wireless LAN compliant with the IEEE 802.11 protocol as a standard of Wi-Fi. The IEEE 802.11 protocol is a standard stipulating a layer 1 and a layer 2 out of seven layers represented by an OSI reference model. The term OSI is an abbreviation for Open Systems Interconnection. The term LAN is an abbreviation for Local Area Network. The wireless LAN includes two operation modes, namely an infrastructure mode in which the communication is performed via a wireless LAN access point, and an ad-hoc mode in which the communication is performed without passing through the wireless access point. In the present embodiment, the description will be presented using an example in which the projector 30 has a function of the wireless access point, and the PC 20 and the projector 30 perform the wireless communication in the infrastructure mode. It should be noted that it is possible for the PC 20 and the projector 30 to perform the wireless communication via a wireless access point other than the PC 20 and the projector 30, or to perform the wireless communication in the ad-hoc mode.

In general, when the PC 20 and the projector 30 are coupled in a wired manner with cables such as an HDMI cable and an analog RGB cable, the user pulls out the cables from the PC 20 to thereby promptly stop the projection of the image G in some cases. The term HDMI is an abbreviation for High Definition Multimedia Interface. HDMI is a registered trademark. In the present embodiment, even when the PC 20 and the projector 30 are wirelessly coupled to each other via the communication device 10, the projection of the image G is promptly stopped when the communication device 10 is pulled out by the user from the PC 20 similarly to the wired coupling. The projector 30 stops the projection of the image G, and then, projects a no-input image GN representing the fact that the image data GD is not input to the projector 30 on the projection surface SC as an image different from the image G. The no-input image GN is an example of a "second image."

Figure 8:
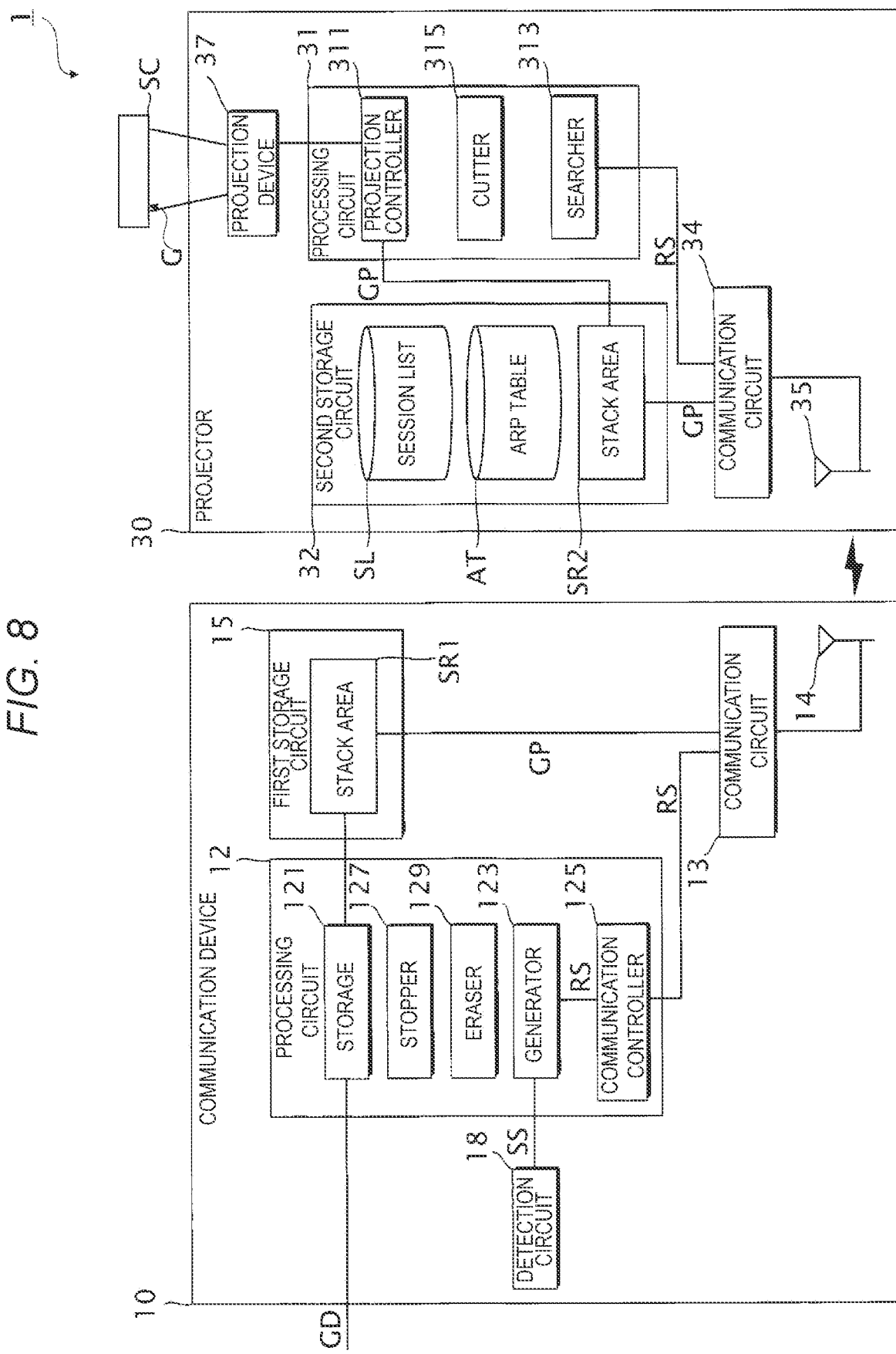
FIG. 8 is a diagram showing an example of a function of the communication system 1.

In the present embodiment, when the communication device 10 is pulled out from the PC 20, the communication device 10 transmits a pullout signal RS shown in FIG. 8 to the projector 30 to thereby promptly stop the projection of the image G. The pullout signal RS is a signal representing the fact that the communication device 10 is pulled out from the PC 20. The reason that the projection of the image G cannot promptly be stopped in the aspect in which the pullout signal RS is not transmitted when the communication device 10 is pulled out from the PC 20 will hereinafter be described. It should be noted that the pullout signal RS is an example of a "first signal."

In general, an application program operating in a device includes a command for invoking a program for processing protocols in the layer 2 through a layer 4 provided by a system program, and a program for processing protocols in a layer 5 and higher layers. The application program is a program used for a certain function or a certain purpose. The system program is a program for performing a basic control and a basic management of the device. As described above, programs fall into the general classification of an application program and a system program. In the following description, the application program is abbreviated as an "app."

In the protocol of the layer 4, it is unachievable to directly detect a phenomenon itself of the disconnection of the communication in the protocol of the layer 2. The reason that the phenomenon itself of the disappearance of the connection cannot directly be detected is that the protocol such as TCP of the layer 4 is established in anticipation of the fact that the temporary lost of the communication in the layer 2 can occur. The term TCP is an abbreviation for Transmission Control Protocol. In the protocol of the layer 4, even when a temporary network disconnection occurs, by executing data retransmission processing or the like, it is possible for the user to continue the operation without being aware of the disconnection. As described above, in the implementation of the protocol of the layer 4, by disguising the disconnection of the communication in the protocol of the layer 2 for a certain period of time as a mere temporary stoppage of the data transmission, the establishment of the communication with the protocol of the layer 5 and higher layers is maintained to enhance the convenience of the user.

As described above, the implementation of the protocol of the layer 4 resistant to disconnection provides the benefits regarding connection maintenance of the communication on the one hand, but in the implementation of the protocol of the layer 4 and higher layers, there is a problem that it is unachievable to promptly detect the fact that the communication is clearly disconnected. Since it is unachievable to directly detect the phenomenon itself of the disconnection of the communication in the protocol of the layer 2, in the disconnection detection of the communication in the protocol of the layer 4, it is often detected that the communication is disconnected due to the fact that the data transmission is not performed for a certain period of time. Hereinafter, the period in which it is assumed that the communication is disconnected is referred to as a "time-out period." When the protocol of a layer 3 is IP, the protocol in the layer 4 is TCP, and the OS is Microsoft Windows, the time-out period is about 93 seconds when the retransmission processing is executed a plurality of times, and about 2 hours in the non-communication state. The term IP is an abbreviation for Internet Protocol. The term OS is an abbreviation for Operation System. Microsoft Windows is a registered trademark.

When the PC 20 and the projector 30 are coupled to each other in a wired manner, it is possible to promptly stop the projection by the projector 30 by pulling out the cables from the PC 20. In this case, the time until the projection stops including the operation of pulling out the cables is no shorter than several seconds and shorter than about 10 seconds. Therefore, an allowable period for the user from when the communication device 10 is pulled out by the user from the PC 20 to when the projection by the projector 30 stops can be inferred as several seconds.

However, the period it takes to detect the disconnection in the protocol of the layer 4 is no shorter than one minute as described above. This period is longer than the allowable period for the user. Therefore, in the protocol of the layer 5 and the higher layers implemented in the app, it is often the case that the disconnection of the communication is detected by uniquely setting the time-out period to thereby enhance a convenience and availability. Here, it is conceivable to adopt an aspect in which by shortening the time-out period to about several seconds, the projection by the projector 30 is promptly stopped when the communication device 10 is pulled out by the user from the PC 20. However, in this aspect, there occurs a disadvantage that there increases a possibility that an erroneous decision of disconnection is made even in the case of a communication error due to a lost or a congestion of the communication in the layer 2.

Therefore, in the present embodiment, as described above, when the communication device 10 is pulled out from the PC 20, the communication device 10 transmits the pullout signal RS to the projector 30. By receiving the pullout signal RS, it is possible for the projector 30 to detect the fact that the communication with the PC 20 is disconnected.

1.1. Configuration of Communication Device 10

Figure 2:
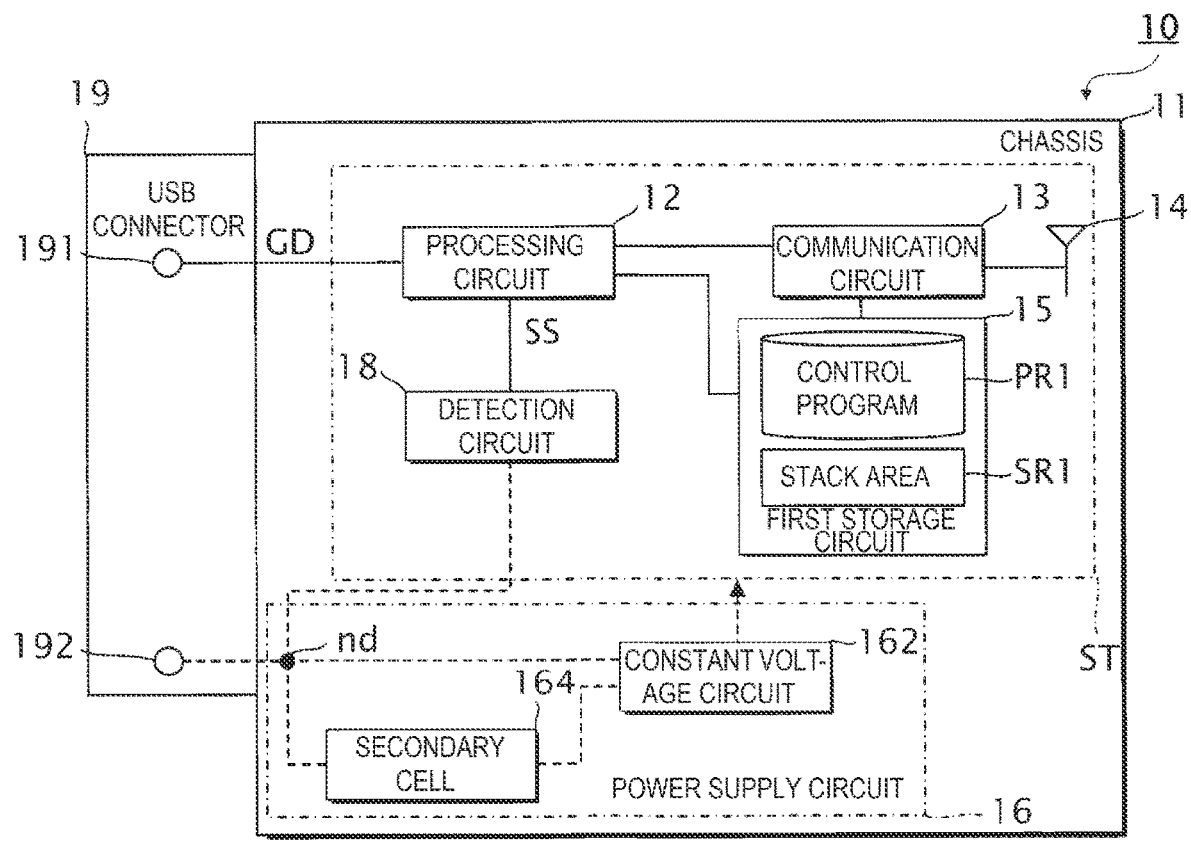
FIG. 2 is a diagram showing an example of a configuration of a communication device 10.

FIG. 2 is a diagram showing an example of a configuration of the communication device 10. The communication device 10 has a processing circuit 12, a communication circuit 13, an antenna 14, a first storage circuit 15, a power supply circuit 16, a detection circuit 18, a communication terminal 191, and a power supply terminal 192. The power supply circuit 16 has a constant voltage circuit 162 and a secondary cell 164. At least two of the processing circuit 12, the communication circuit 13, and the first storage circuit 15 can be formed of a single circuit. It should be noted that in the following description, the explanation is presented using an example in which the processing circuit 12, the communication circuit 13, and the first storage circuit 15 are separated from each other for the sake of clarification of the explanation. The processing circuit 12, the communication circuit 13, the antenna 14, the first storage circuit 15, the power supply circuit 16, and the detection circuit 18 are housed in a chassis 11. The communication terminal 191 and the power supply terminal 192 are disposed in a USB connector 19. The USB connector 19 protrudes from a side surface of the chassis 11. Out of lines which couple the elements shown in FIG. 2 to each other, solid lines represent signal lines, and dotted lines represent supply lines for supplying electrical power. It should be noted that the signal lines and the supply lines shown in FIG. 2 are simplified, and in actual wiring lines, there are arbitrarily disposed, for example, diodes for preventing a reverse current. It should be noted that the USB connector 19 is an example of a "connector."

The power supply circuit 16 supplies a power-fed circuit ST with the electrical power. The power-fed circuit ST is supplied with the electrical power from the power supply circuit 16. The power-fed circuit ST is provided with the processing circuit 12, the communication circuit 13, the antenna 14, the first storage circuit 15, and the detection circuit 18. By the USB connector 19 being inserted into the PC 20, the communication device 10 receives the image data GD from the PC 20 via the communication terminal 191, and is supplied with a power supply voltage via the power supply terminal 192.

It should be noted that in the present embodiment, "supplying the power supply voltage to each of the constituents of the power-fed circuit ST" means applying the power supply voltage as a potential difference between a power supply potential at a high potential side and a reference potential at a low potential side to each of the circuits included in the power-fed circuit ST by setting the power supply potential at the high potential side and the reference potential at the low potential side such as a ground potential to each of the circuits included in the power-fed circuit ST. "Applying the power supply voltage to the power-fed circuit ST" is hereinafter expressed as "supplying the power supply voltage to the power-fed circuit ST" in some cases.

The processing circuit 12 is a computer such as a CPU. The term CPU is an abbreviation for Central Processing Unit. The processing circuit 12 can also be formed of a single processor, or a plurality of processors.

The communication circuit 13 is hardware for performing communication with the projector 30 with a wireless LAN. More particularly, the communication circuit 13 has a baseband circuit and an RF circuit. The term RF is an abbreviation for Radio Frequency. The baseband circuit performs a transmission digital signal processing on a digital signal instructed by the processing circuit 12 to generate the transmission digital signal. The baseband circuit performs a D/A conversion on the transmission digital signal to thereby generate the transmission analog signal. The term D/A is an abbreviation for Digital to Analog. The transmission analog signal is output to the RF circuit. Further, the baseband circuit performs an A/D conversion on a reception analog signal output from the RF circuit to thereby convert the reception analog signal into a reception digital signal, and at the same time, performs reception digital signal processing on the reception digital signal to thereby generate a digital signal. The term A/D is an abbreviation for Analog to Digital. The baseband circuit outputs the digital signal thus processed to the processing circuit 12. The RF circuit modulates a carrier wave with the transmission analog signal to thereby generate a transmission signal. The transmission signal is transmitted to the projector 30 via the antenna 14. Further, the RF circuit demodulates a reception signal received via the antenna 14 to thereby generate the reception analog signal. The RF circuit outputs the reception analog signal to the baseband circuit.

The antenna 14 performs receiving a radio wave of the wireless LAN and then converting the radio wave into an electrical signal, and converting the electrical signal into the radio wave of the wireless LAN and then radiating the radio wave thus converted.

The first storage circuit 15 is formed of a magnetic storage device, a flash ROM, or the like. The term ROM is an abbreviation for Read Only Memory. The first storage circuit 15 is a recording medium which can be read by the processing circuit 12, and stores a plurality of programs including a control program PR1 to be executed by the processing circuit 12, a variety of types of information to be used by the processing circuit 12, and so on. The control program PR1 is a program for controlling the communication device 10. Further, in the first storage circuit 15, there is disposed a stack area SR1 for temporarily accumulating a PDU of the layer 3 including the image data GD representing the image G received from the PC 20. The term PDU is an abbreviation for Protocol Data Unit. In general, the PDU of the layer 2 is referred to as a frame, and the PDU of the layer 3 is referred to as a packet. In the following description, the PDU of the layer 3 including the image data GD is referred to as an "image packet GP." For example, the image packet GP has the image data GD in a payload part of an IP format. The stack area SR1 can store a plurality of image packets GP. The stack area SR1 is implemented as, for example, a ring buffer. It should be noted that the image data GD is an example of "data obtained via a connector." The image packet GP is an example of "communication data based on the data obtained via the connector."

The constant voltage circuit 162 converts the voltage supplied to the constant voltage circuit 162 into a voltage with which the constituents of the power-fed circuit ST can stably operate. More particularly, the voltage supplied to the constant voltage circuit 162 is a voltage of electrical power supplied from the PC 20 via the power supply terminal 192 and a relay node nd when the USB connector 19 is inserted into the PC 20, and is a voltage to be supplied from the secondary cell 164 when the USB connector 19 is pulled out from the PC 20.

The secondary cell 164 is an electronic component to be charged and discharged. The secondary cell is also referred to as a capacitor. When the USB connector 19 is inserted into the PC 20, the secondary cell 164 is charged by the electric power supplied from the PC 20 via the power supply terminal 192 and the relay node nd. When the USB connector 19 is pulled out from the PC 20, the secondary cell 164 is discharged to the constant voltage circuit 162.

When the detection circuit 18 monitors the voltage of the electrical power supplied from the PC 20 via the USB connector 19, and thus, the voltage of the electrical power supplied from the PC 20 becomes equal or less than a predetermined level, the detection circuit 18 detects the fact that the USB connector 19 is pulled out from the PC 20. The predetermined level is, for example, a half of a voltage with which the processing circuit 12 can stably operate. The detection circuit 18 is constituted by, for example, a low-pass filter and a comparator. An input of the low-pass filter is supplied with a voltage of the relay node nd. The comparator is provided with a negative input terminal and a positive input terminal. The negative input terminal is supplied with an output signal output from the low-pass filter. The positive input terminal is supplied with a voltage at a predetermined level. The comparator operates with the electrical power supplied from the power supply circuit 16. Therefore, even when the communication device 10 is pulled out from the PC 20, the detection circuit 18 operates. Further, a spike-like noise and so on generated due to the pullout of the communication device 10 are removed by the low-pass filter. The comparator outputs a detection signal SS turning to a high level when the output signal of the low-pass filter falls below a predetermined level.

The operation of the detection circuit 18 will be described in more detail. The detection circuit 18 monitors the voltage of the electrical power to be supplied from the PC 20 via the relay node nd. When the USB connector 19 is inserted into the PC 20, the PC 20 outputs a stabilized voltage of 5 V to the communication device 10 in accordance with the USB standard. When the USB connector 19 is pulled out from the PC 20, the voltage at the relay node nd becomes 0. When the voltage at the relay node nd lowers, and the voltage having lowered becomes equal or less than a predetermined level, the detection circuit 18 detects the fact that the USB connector 19 is pulled out from the PC 20. When the detection circuit 18 detects the fact that the USB connector 19 is pulled out from the PC 20, the detection circuit 18 outputs the detection signal SS to the processing circuit 12.

1.2. Configuration of PC 20

Figure 3:
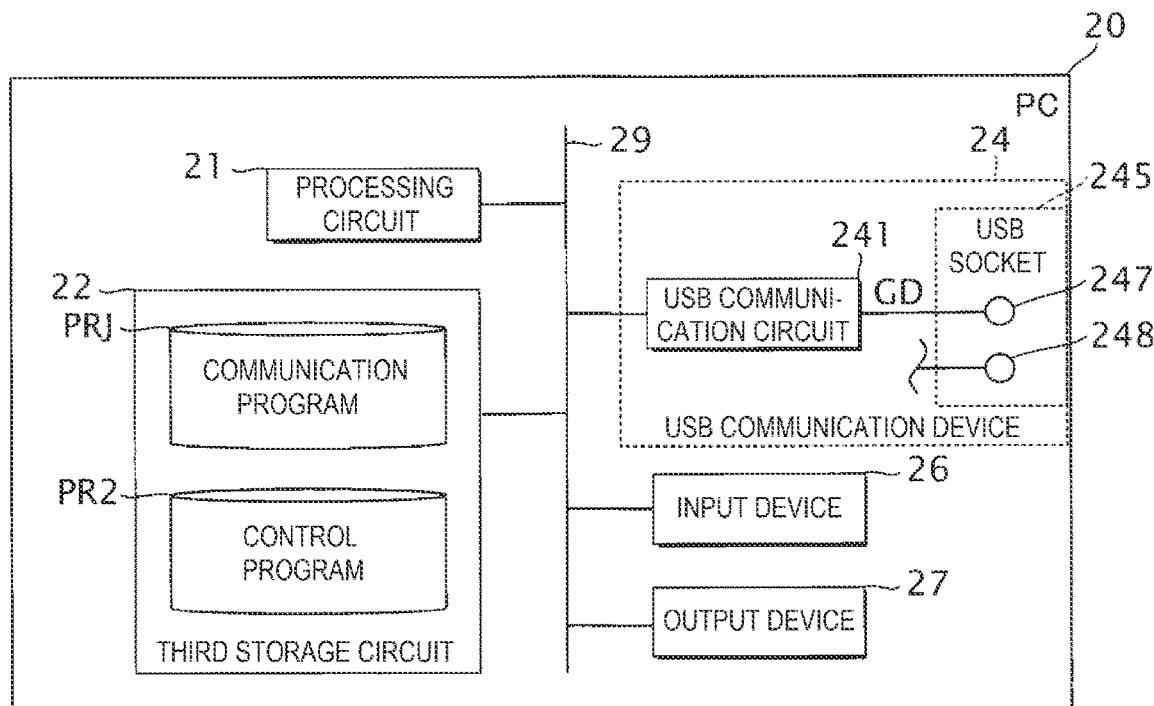
FIG. 3 is a diagram showing an example of a configuration of a PC 20.

FIG. 3 is a diagram showing an example of a configuration of the PC 20. The PC 20 has at least one processing circuit 21, a third storage circuit 22, a USB communication device 24, an input device 26, and an output device 27. The processing circuit 21, the third storage circuit 22, the USB communication device 24, the input device 26, and the output device 27 are coupled to each other with a bus 29 for communicating information.

The processing circuit 21 is a computer such as a CPU. It should be noted that the processing circuit 21 can also be formed of a single processor, or a plurality of processors.

The third storage circuit 22 is formed of a magnetic storage device, a flash ROM, or the like. The third storage circuit 22 is a recording medium which can be read by the processing circuit 21, and stores a plurality of programs including a communication program PRJ and a control program PR2 to be executed by the processing circuit 21, a variety of types of information to be used by the processing circuit 21, and so on. The communication program PRJ is an application program for controlling the operation of the communication system 1. For example, when the communication device 10 is first inserted into the PC 20, the PC 20 downloads the communication program PRJ from the projector 30 or an external server via the projector 30. The control program PR2 is a system program including the OS and so on of the PC 20.

The USB communication device 24 is a network device for communicating with the communication device 10 inserted into the PC 20 in accordance with the USB standard. The USB communication device 24 has a USB communication circuit 241, a communication terminal 247, and a power supply terminal 248. Further, the USB communication device 24 is provided with a USB socket 245. The USB socket 245 is a socket for the USB connector 19. Inside the USB socket 245, there are disposed the communication terminal 247 and the power supply terminal 248. By the USB connector 19 being inserted into the PC 20, the communication terminal 247 makes contact with the communication terminal 191, and the power supply terminal 248 makes contact with the power supply terminal 192.

The USB communication circuit 241 is hardware for communicating with the communication device 10 inserted into the USB socket 245. When the communication device 10 is inserted into the USB socket 245, the communication terminal 247 receives the image data GD output from the USB communication circuit 241, and then transmits the image data GD to the communication device 10. When the communication device 10 is inserted into the USB socket 245, the power supply terminal 248 supplies a voltage of electrical power from a power source not shown to the communication device 10. The power source not shown is a commercial power source such as an AC power source, or the battery power source in the PC 20. The term AC is an abbreviation for Alternating Current.

The input device 26 is equipment for the user to input information. The input device 26 is, for example, a mouse and a keyboard.

The output device 27 is equipment for outputting information to the outside. The output device 27 is, for example, a display. Further, it is possible to adopt a configuration in which the input device 26 and the output device 27 are integrated with each other. The configuration in which the input device 26 and the output device 27 are integrated with each other is, for example, a touch panel.

1.3. Configuration of Projector 30

FIG. 4 is a diagram showing an example of a configuration of the projector 30. The projector 30 has at least one processing circuit 31, a second storage circuit 32, a communication circuit 34, an antenna 35, an input device 36, and a projection device 37. The processing circuit 31, the second storage circuit 32, the communication device 34, the input device 36, and the projection device 37 are coupled to each other with a bus 39 for communicating information.

The processing circuit 31 is a computer such as a CPU. It should be noted that the processing circuit 31 can also be formed of a single processor, or a plurality of processors.

The second storage circuit 32 is formed of a magnetic storage device, a flash ROM, or the like. The second storage circuit 32 is a recording medium which can be read by the processing circuit 31, and stores a plurality of programs including a control program PR3, a projection program PP, and a program for realizing a function of a wireless LAN access point to be executed by the processing circuit 31, an ARP table AT, a session list SL, no-input image data GND, a variety of types of information to be used by the processing circuit 31, and so on. The control program PR3 is a system program including the OS and so on of the projector 30. The projection program PP is an app, and is a program for executing processing of projecting the image G on the projection surface SC based on the image data GD received from the PC 20. Further, in the second storage circuit 32, there is disposed a stack area SR2 for temporarily accumulating the image packet GP. The stack area SR2 can store a plurality of image packets GP. The stack area SR2 is implemented as, for example, a ring buffer. The no-input image data GND represents the no-input image GN.

FIG. 5 is a diagram showing an example of a content of the ARP table AT. The ARP table AT is a table in which the IP address assigned to a communication destination device and the MAC address of the communication destination device are made to correspond to each other. The term ARP is an abbreviation for Address Resolution Protocol. The term MAC is an abbreviation for Media Access Control. The MAC address is used in the protocol belonging to the layer 2 of an OSI reference model. The IP is a protocol belonging to the layer 3 of the OSI reference model. As the IP, there exist IPv4 and IPv6, and the present embodiment can be applied to both of IPv4 and IPv6. The description will hereinafter be presented using an example using IPv4. It should be noted that when using IPv6, the second storage circuit 32 stores a neighbor cache instead of the ARP table AT. The neighbor cache is also a table in which the IP address and the MAC address are made to correspond to each other. ARP is a protocol of obtaining the MAC address of a device to which a certain IP address is assigned. In the following description, a record in the ARP table AT is referred to as an "entry" in some cases. In the ARP table AT illustrated in FIG. 5, there is registered a single entry.

In the present embodiment, it is assumed that the IP address assigned to the projector 30 is "192.168.0.30," and the IP address assigned to the communication device 10 is "192.168.0.10." FIG. 5 shows an example in which the IP address assigned to the communication device 10 as the communication destination device of the projector 30 is "192.168.0.10," and the MAC address of the communication device 10 is "12-34-56-78-90-ab."

FIG. 6 is a diagram showing an example of a content of the session list SL. The session list SL stores session identification information for identifying the session managed by the projection program PP operating in the projector 30, and state information representing the state of the session. The session list exists for each of the programs. The session list SL illustrated in FIG. 6 corresponds to the projection program PP.

The session represents a series of communications for managing the state between the programs executed in two devices communicating with each other to perform dialogical processing. The session identification information includes local address information having the IP address and a port number of the own device, and external address information having the IP address and the port number of the communication destination device. The port number is a number which is used in TCP and UDP belonging to the layer 4 of the OSI reference model, and designates which one of the plurality of programs operating in the device performs the communication. The term UDP is an abbreviation for User Datagram Protocol.

The state information is a character string representing the state of the session. The connection information includes, for example, "ESTABLISHED" representing the fact that the connection of the communication has been established, "CLOSED" representing the state in which no communication exists, and so on.

In the example shown in FIG. 6, there is shown the fact that there is established the connection of the session identified by the IP address "192.168.0.30" and the port number p1 assigned to the projector 30, and the IP address "192.168.0.10" and the port number p2 assigned to the communication device 10. The port numbers p1, p2 are each any one of integers from 0 to 65535.

The description will be returned to FIG. 4. The communication circuit 34 is hardware for performing communication with the communication device 10 with the wireless LAN. Since the details of the communication circuit 34 are substantially the same as those of the communication circuit 13, the description thereof is omitted.

The antenna 35 performs receiving a radio wave of the wireless LAN and then converting the radio wave into an electrical signal, and converting the electrical signal into the radio wave of the wireless LAN and then radiating the radio wave thus converted.

The input device 36 is equipment for the user to input information. The input device 36 is a plurality of buttons including, for example, a function list display key, an up key, a down key, a left key, a right key, a decision key, and a cancel key. The up key, the down key, the left key, and the right key are hereinafter collectively called direction keys. Alternatively, the input device 36 can be formed of one or more types of devices such as a pointing device and a touch panel. Alternatively, it is possible for the projector 30 to communicate with a remote controller having the plurality of buttons described above instead of the input device 36.

The projection device 37 projects the image G on the projection surface SC. A configuration of the projection device 37 will be described using FIG. 7.

Figure 7:
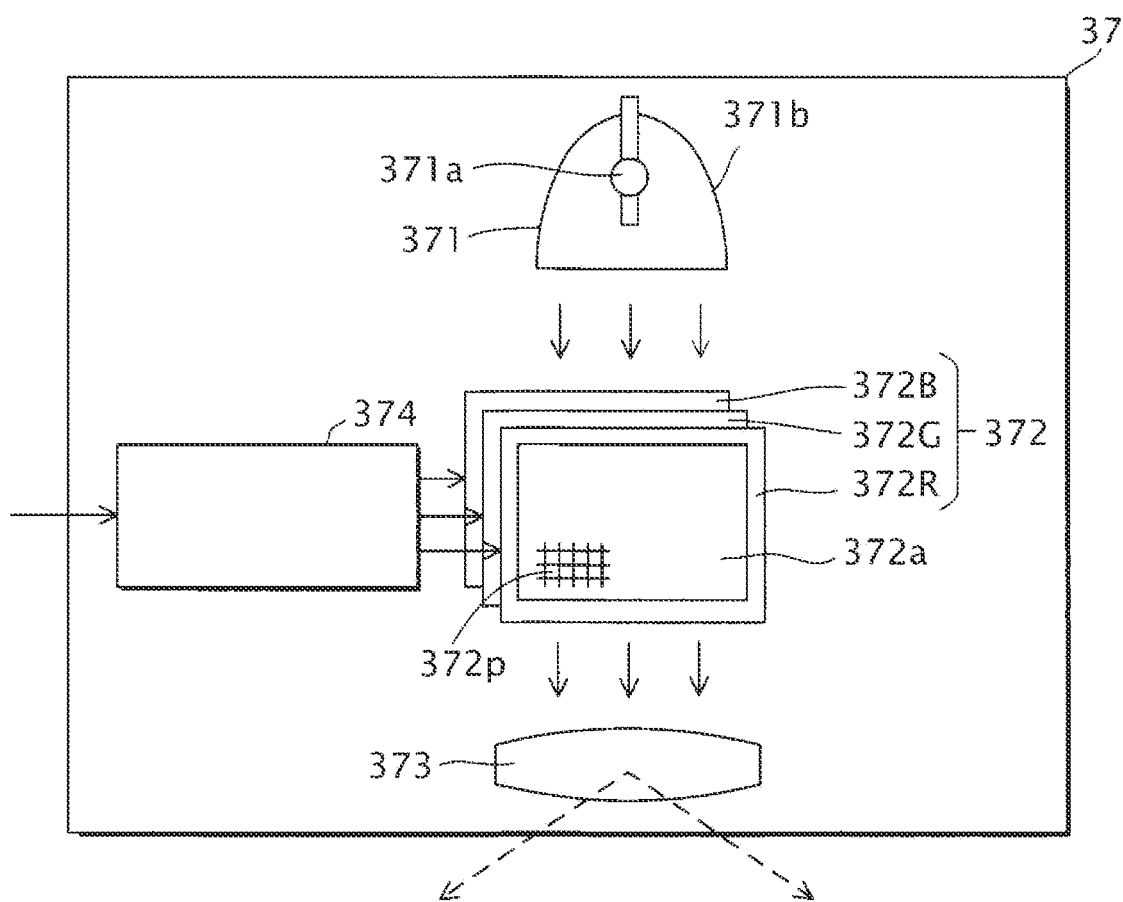
FIG. 7 is a diagram showing an example of a projection device 37.

FIG. 7 is a diagram showing an example of the projection device 37. The projection device 37 includes a light source 371, three liquid crystal light valves 372R, 372G, and 372B as an example of a light modulation device, a lens 373 as an example of a projection optical system, a light valve driver 374 and so on. The projection device 37 generates modulated light which is obtained by modulating the light emitted from the light source 371 with liquid crystal light valves 372 due to the control by the processing circuit 31, and then projects the image G from the lens 373 in an enlarged manner. The image is displayed on the projection surface SC.

The light source 371 includes a light source unit 371*a* formed of a xenon lamp, a super high-pressure mercury lamp, an LED, a laser source, or the like, and a reflector 371*b* for reducing a variation in direction of the light radiated by the light source unit 371*a*. The term LED is an abbreviation for Light Emitting Diode. The light emitted from the light source 371 is reduced in variation in a luminance distribution by an integrator optical system not shown, and is then separated by a color separation optical system not shown into colored light components of red, green, and blue as the three primary colors of light. The colored light components of red, green, and blue respectively enter the liquid crystal light valves 372R, 372G, and 372B.

The liquid crystal light valves 372 are each constituted by a liquid crystal panel having a liquid crystal material encapsulated between a pair of transparent substrates, and so on. The liquid crystal light valves 372 are each provided with a pixel area 372*a* having a rectangular shape and formed of a plurality of pixels 372*p* arranged in a matrix. In each of the liquid crystal light valves 372, it is possible to apply a drive voltage to the liquid crystal for each of the pixels 372*p*. When the light valve driver 374 applies the drive voltages corresponding to the image data GD to the respective pixels 372*p*, each of the pixels 372*p* is set to a light transmittance corresponding to the image data GD. Therefore, the light emitted from the light source 371 is transmitted through the pixel area 372*a* to thereby be modulated, and thus, the image G to be projected on the projection surface SC is formed for each colored light.

1.4. Function of Communication System 1

FIG. 8 is a diagram showing an example of a function of the communication system 1. The processing circuit 12 reads out the control program PR1 from the first storage circuit 15, and then executes the control program PR1 thus read out to thereby function as a storage 121, a generator 123, a communication controller 125, a stopper 127, and an eraser 129. Further, the processing circuit 31 reads out the control program PR3 from the second storage circuit 32, and executes the control program PR3 thus read out to thereby function as a searcher 313. Further, the processing circuit 31 reads out the projection program PP from the second storage circuit 32, and executes the projection program PP thus read out to thereby function as a projection controller 311, and a cutter 315.

The communication system 1 executes projection processing to be executed when projecting the image G on the projection surface SC, and pullout processing to be executed when the USB connector 19 is pulled out from the PC 20. A function of the communication system 1 when executing the projection processing and a function of the communication system 1 when executing the pullout processing will hereinafter be described.

1.4.1. Function of Communication System 1 when Executing Projection Processing When the communication system 1 executes the projection processing, the processing circuit 12 functions as the storage 121, and the processing circuit 31 functions as the projection controller 311. When the storage 121 receives the image data GD from the PC 20, the storage 121 stores the image packet GP including the image data GD in the stack area SR1.

The communication circuit 13 sequentially reads out the image packet GP from the stack area SR1 to transmit the image packet GP to the projector 30. The communication circuit 34 stores the image packet GP received from the communication device 10 in the stack area SR2. More particularly, the communication circuit 13 generates a frame obtained by encapsulating the image packet GP, and then transmits the frame to the projector 30. The communication circuit 34 receives the frame, and then stores the image packet GP stored in the payload part of the frame in the stack area SR2. It should be noted that in order to prevent the description from being complicated, in the following description, there is described that the communication circuit 13 transmits the image packet GP and the communication circuit 34 receives the image packet GP.

The projection controller 311 sequentially reads out the image packets GP from the stack area SR2 to obtain the image data GD based on the image packets GP thus read out. Then, the projection controller 311 makes the projection device 37 project the image G based on the image data GD. It should be noted that it is possible for the processing circuit 31 to store the image packets GP in the stack area SR2.

1.4.2. Function of Communication System 1 when Executing Pullout Processing When executing the pullout processing, the processing circuit 12 functions as the generator 123, the communication controller 125, the stopper 127, and the eraser 129, and the processing circuit 31 functions as the searcher 313 and the cutter 315.

When the USB connector 19 is pulled out from the PC 20, the detection circuit 18 transmits the detection signal SS to the processing circuit 12. Further, when the USB connector 19 is pulled out from the PC 20, the constant voltage circuit 162 converts the voltage of the electrical power of the secondary cell 164, and then supplies the electrical power having the voltage thus converted to the power-fed circuit ST.

When the communication device 10 receives the detection signal SS from the detection circuit 18, the generator 123 generates the pullout signal RS. The pullout signal RS is, for example, a Deauthentication frame stipulated in the IEEE 802.11 protocol. A reason code of the Deauthentication frame as the pullout signal RS is preferably, for example, 3, but can be another value. The transmission source MAC address of the pullout signal RS is the MAC address of the communication device 10. The destination MAC address of the pullout signal RS is the MAC address of the projector 30. For example, the processing circuit 12 obtains the MAC address of the projector 30 with the ARP, and then stores the MAC address in the first storage circuit 15. The generator 123 sets the MAC address stored in the first storage circuit 15 to the destination MAC address of the pullout signal RS.

The communication controller 125 controls the communication circuit 13 to transmit the pullout signal RS to the projector 30. Since the destination MAC address of the pullout signal RS is the MAC address of the projector 30, the communication circuit 13 transmits the pullout signal RS to the projector 30 with unicasting. It is sufficient for the secondary cell 164 to be able to charge the electrical power with which the generation of the pullout signal RS and the transmission of the pullout signal RS can be executed.

When the communication device 10 receives the detection signal SS from the detection circuit 18, the stopper 127 stops the operation of the storage 121 to thereby stop storing the image packet GP in the stack area SR1. Subsequently, the eraser 129 erases the image packets GP stored in the stack area SR1. A specific example of the erasion will be described. The stack area SR1 is implemented as the ring buffer, and is associated with a writing pointer and a reading pointer. The eraser 129 makes the value of the reading pointer coincide with the value of the writing pointer to thereby erase the image packet GP stored in the stack area SR1.

When the communication circuit 34 receives the pullout signal RS, the communication circuit 34 outputs the pullout signal RS to the processing circuit 31.

The searcher 313 searches the ARP table AT for the IP address made to correspond to the transmission source MAC address of the pullout signal RS.

When the IP address is found out by the searcher 313, the cutter 315 determines whether or not the IP address thus found exists in the session list SL. When the IP address is found out from the session list SL, the cutter 315 executes cut processing. The cut processing is processing corresponding to the pullout signal RS. The cut processing is the same as, for example, time-out processing to be executed when a time-out period elapses. The cut processing includes, for example, processing of stopping projecting the image G and projecting the no-input image GN, and processing of erasing the image packets GP stored in the stack area SR2.

Figure 9:
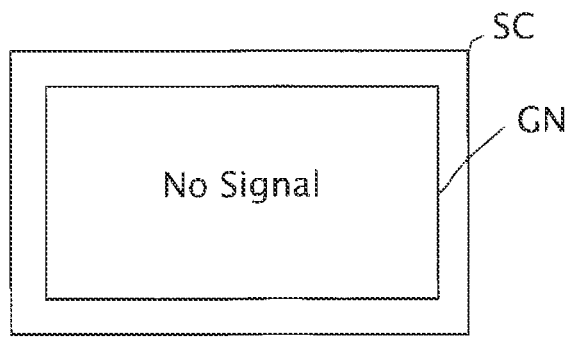
FIG. 9 is a diagram showing an example of a no-input image GN.

FIG. 9 is a diagram showing an example of the no-input image GN. The projection device 37 projects the no-input image GN on the projection surface SC based on the no-input image data GND. The no-input image GN includes a character string "No Signal" representing the fact that the image data GD is not input to the projector 30.

1.5. Operation of Communication System 1

The projection processing and the pullout processing to be executed by the communication system 1 will be described using FIG. 10 through FIG. 12.

Figure 10:
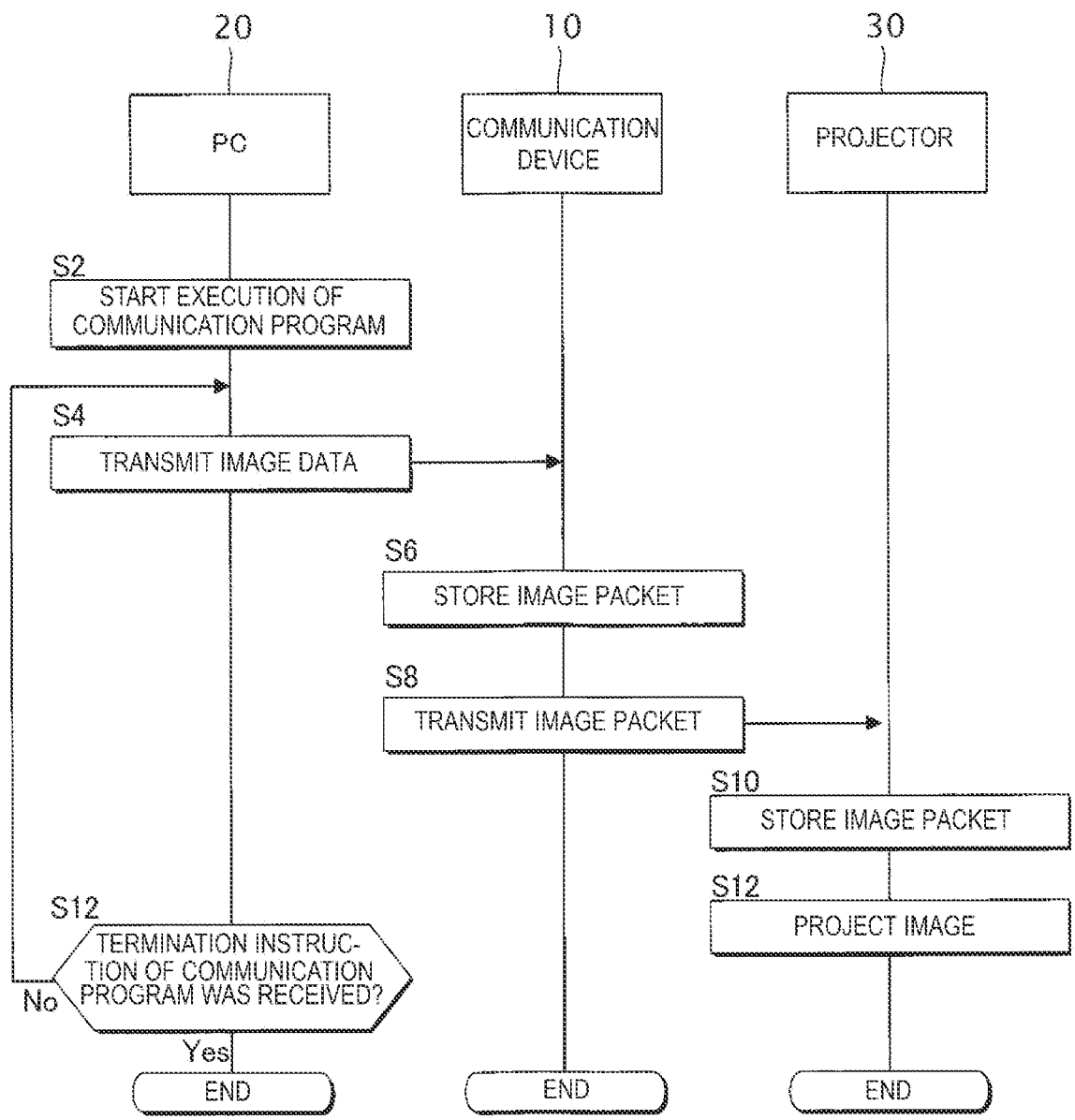
FIG. 10 is a diagram showing a flowchart showing an example of projection processing.

FIG. 10 is a flowchart showing an example of the projection processing. When the communication system 1 executes the projection processing, the PC 20 starts the execution of the communication program PRJ in the step S2. The processing circuit 21 of the PC 20 transmits the image data GD to the communication device 10 in the step S4. The processing circuit 12 of the communication device 10 stores the image packet GP including the image data GD to the stack area SR1 in the step S6. The processing in the step S6 corresponds to the storage 121.

In the step S8, the processing circuit 12 controls the communication circuit 13 to transmit the image packet GP stored in the stack area SR1 to the projector 30.

When the communication circuit 34 of the projector 30 receives the image packet GP, the communication circuit 34 stores the image packet GP thus received to the stack area SR2 in the step S10. Then, in the step S12, the processing circuit 31 controls the projection device 37 to project the image G on the projection surface SC based on the image data GD included in the image packet GP. The processing in the step S12 corresponds to the projection controller 311.

After the termination of the processing in the step S4, the processing circuit 21 determines whether or not the termination instruction of the communication program PRJ by an operation of the user of the PC 20 is received. When a result in the step S12 is No, the processing circuit 21 returns the process to the step S4. When the result in the step S12 is Yes, the communication system 1 terminates the series of processing shown in FIG. 10.

Figure 11:
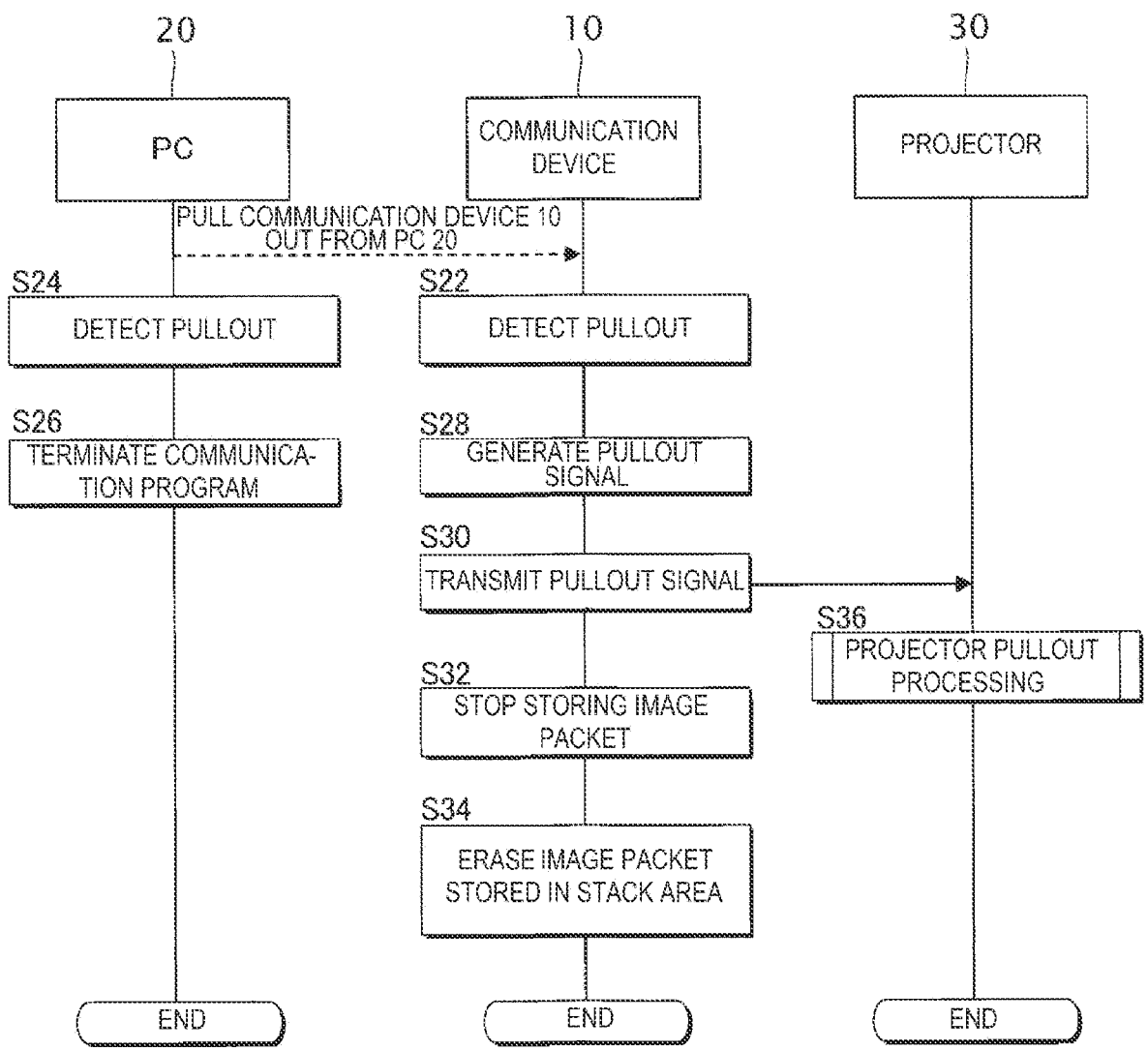
FIG. 11 is a diagram showing a flowchart showing an example of pullout processing.

FIG. 11 is a flowchart showing an example of the pullout processing. When the USB connector 19 is pulled out from the PC 20, the detection circuit 18 detects the fact that the USB connector 19 is pulled out from the PC 20 in the step S22. When the detection circuit 18 detects the fact that the USB connector 19 is pulled out from the PC 20, the detection circuit 18 outputs the detection signal SS to the processing circuit 12.

Further, the processing circuit 21 also detects the fact that the USB connector 19 is pulled out from the PC 20 in the step S24. After the termination of the processing in the step S24, the processing circuit 21 terminates the communication program PRJ in the step S26. After terminating the processing in the step S26, the PC 20 terminates the series of processing shown in FIG. 11.

When the detection circuit 18 outputs the detection signal SS to the processing circuit 12, the processing circuit 12 generates the pullout signal RS in the step S28. The processing in the step S28 corresponds to the generator 123.

After terminating the processing in the step S28, in the step S30, the processing circuit 12 controls the communication circuit 13 to transmit the pullout signal RS to the projector 30. The processing in the step S30 corresponds to the communication controller 125. Subsequently, in the step S32, the processing circuit 12 stops storing the image packet GP to the stack area SR1. The processing in the step S32 corresponds to the stopper 127. After terminating the processing in the step S32, in the step S34, the processing circuit 12 erases the image packets GP stored in the stack area SR1. The processing in the step S34 corresponds to the eraser 129. After terminating the processing in the step S34, the communication device 10 terminates the series of processing shown in FIG. 11. It should be noted that after terminating the processing in the step S34, the secondary cell 164 is fully discharged, and the communication device stops the operation.

It should be noted that after terminating the processing in the step S22, it is possible for the processing circuit 12 to execute the processing in the step S32 and the processing in the step S34 in advance of the processing in the step S28 and the processing in the step S30, or to execute the processing in the step S32 and the processing in the step S34 in parallel to the processing in the step S28 and the processing in the step S30.

When the projector 30 receives the pullout signal RS from the communication device 10, the projector 30 executes projector pullout processing in the step S36. After terminating the processing in the step S36, the projector 30 terminates the series of processing shown in FIG. 11. The projector pullout processing will be described using FIG. 12.

Figure 12:
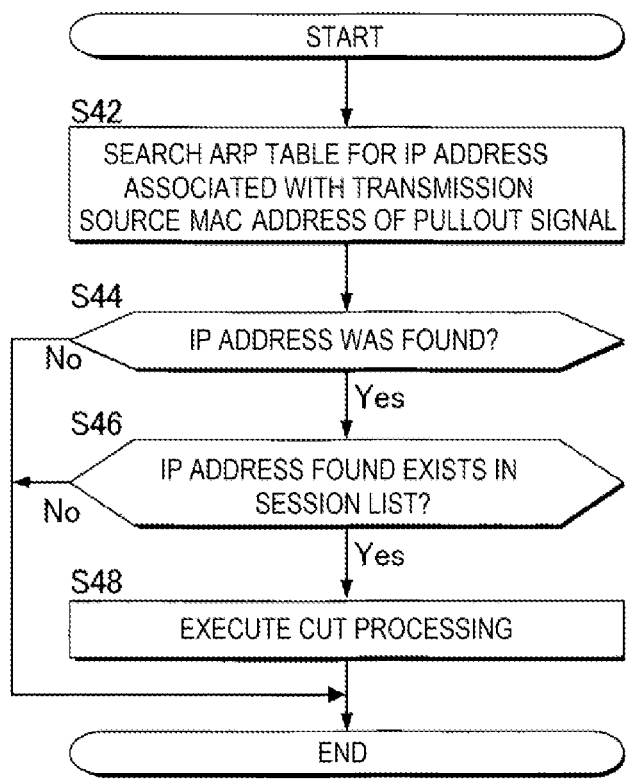
FIG. 12 is a diagram showing a flowchart showing projector pullout processing.

FIG. 12 is a flowchart showing the projector pullout processing. The projector pullout processing is processing which is a part of the pullout processing, and which is executed by the projector 30. In the step S42, the processing circuit 31 searches the ARP table AT for the IP address made to correspond to the MAC address coinciding with the transmission source MAC address of the pullout signal RS. The processing in the step S42 is an example of the searcher 313.

Then, in the step S44, the processing circuit 31 determines whether or not the IP address is found out. When the result in the step S44 is No, namely the IP address is not found out, the projector 30 terminates the series of processing shown in FIG. 12. When the result in the step S44 is Yes, in the step S46, the processing circuit 31 determines whether or not the IP address having been found out exists in the session list SL corresponding to the projection program PP. When the result in the step S46 is No, namely the IP address having been found out does not exist in the session list SL corresponding to the projection program PP, the projector 30 terminates the series of processing shown in FIG. 12. When the result in the step S46 is Yes, in the step S48, the processing circuit 31 executes the cut processing. The processing in the step S48 corresponds to the cutter 315. After terminating the processing in the step S48, the projector 30 terminates the series of processing shown in FIG. 12.

1.6. Conclusion of First Embodiment

As described hereinabove, the communication device 10 according to the first embodiment is provided with the USB connector 19 to be inserted into the PC 20, the communication circuit 13 for performing the wireless communication with the projector 30, and the processing circuit 12 which communicates with the PC 20 via the USB connector 19 to control the communication circuit 13. When the processing circuit 12 detects the fact that the USB connector 19 is pulled out from the PC 20, the processing circuit 12 executes the step of generating the pullout signal RS representing the fact that the USB connector 19 is pulled out, and the step of controlling the communication circuit 13 to transmit the pullout signal RS to the projector 30.

By receiving the pullout signal RS, it is possible for the projector 30 to detect the fact that the communication device 10 is pulled out from the PC 20. Therefore, when the transmission of the image data GD stops, it is possible for the projector 30 to identify that the transmission of the image data GD temporarily stops. Therefore, it is possible for the projector 30 to distinguish between the fact that the communication device 10 is pulled out from the PC 20 and the fact that the transmission of the image data GD temporarily stops. Since it is possible to distinguish between the fact that the communication device 10 is pulled out from the PC 20 and the fact that the transmission of the image data temporarily stops, it is possible for the projector 30 to promptly stop the projection by the projection device 37 when the projector 30 detects the fact that the communication device 10 is pulled out from the PC 20.

In contrast, in the aspect in which the projection by the projection device 37 stops on the grounds that the time-out period elapses without transmitting the pullout signal RS, when the communication device 10 is pulled out from the PC 20, the operation of the projector 30 from the PC 20 inevitably becomes impossible. It is true that the operation of the projector 30 is possible by inserting the USB connector 19 of the communication device 10 having been pulled out into the PC 20 or other devices. However, until the USB connector 19 is inserted, the operation from the PC 20 is not received, and the image G projected last is kept displayed on the projection surface SC. In contrast, according to the present embodiment, it is possible to suppress the time from when the communication device 10 is pulled out from the PC 20 to when the projection by the projection device 37 stops to within one second.

Further, the communication device 10 is provided with the detection circuit 18 which monitors the voltage of the electrical power supplied form the PC 20 via the USB connector 19 to thereby output the detection signal SS when the voltage becomes equal or less than a predetermined level. When the processing circuit 12 receives the detection signal SS, the processing circuit 12 detects the fact that the USB connector 19 has been pulled out from the PC 20.

According to the first embodiment, it is possible to surely detect the fact that the USB connector 19 has been pulled out from the PC 20.

Further, the communication device 10 is further provided with the secondary cell 164 which supplies the communication circuit 13 and the processing circuit 12 with the electrical power when the fact that the USB connector 19 has been pulled out is detected.

According to the present embodiment, even when the USB connector 19 has been pulled out from the PC 20, and the supply of the electrical power from the PC 20 stops, it is possible to transmit the pullout signal RS to the projector 30 due to the electrical power supplied from the secondary cell 164.

Further, the communication device 10 further includes the first storage circuit 15 having the stack area SR1 for storing the image packet GP based on the image data GD obtained from the PC 20 via the USB connector 19. When the processing circuit 12 detects the fact that the USB connector 19 has been pulled out, the processing circuit 12 erases the image packet GP stored in the stack area SR1.

After the user pulls out the USB connector 19 from the PC 20, it is preferable for the projector 30 not to project the image G based on the image data GD. However, when the image packet GP is stored in the stack area SR1, there is a possibility that the communication circuit 13 transmits the image packet GP to the projector 30 even after the USB connector 19 is pulled out from the PC 20. According to the present embodiment, by erasing the image packet GP stored in the stack area SR1, it is possible for the communication circuit 13 to prevent the image packet GP from being unnecessarily transmitted, and thus it is possible for the communication circuit 13 to suppress the power consumption. Since the power consumption can be suppressed, it is possible to decrease the maximum electrical power which the secondary cell 164 can charge compared to an aspect in which the image packet GP stored in the stack area SR1 is not erased.

The communication system 1 is provided with the PC 20, the communication device 10 for performing the wireless communication, and the projector 30 for performing the wireless communication. The communication device 10 has the USB connector 19 to be inserted into the PC 20, the communication circuit 13 for performing the wireless communication with the projector 30, and the processing circuit 12 which communicates with the PC 20 via the USB connector 19 to control the communication circuit 13. When the processing circuit 12 detects the fact that the USB connector 19 has been pulled out from the PC 20, the processing circuit 12 executes the step of generating the pullout signal RS representing the fact that the USB connector 19 has been pulled out, and the step of controlling the communication circuit 13 to transmit the pullout signal RS to the projector 30. When the projector 30 receives the pullout signal RS, the projector 30 executes the cut processing as an example of the processing corresponding to the pullout signal RS.

By receiving the pullout signal RS, it is possible for the projector 30 to detect the fact that the communication device 10 is pulled out from the PC 20. Therefore, when the projector 30 receives the pullout signal RS, it is possible for the projector 30 to execute the cut processing at an earlier timing compared to the aspect in which the projection by the projection device 37 stops due to the expiration of the time-out period without transmitting the pullout signal RS.

The projector 30 executes the step of displaying the image G based on the image data GD when the projector 30 receives the image packet GP from the communication device 10, and the step of displaying the no-input image GN different from the image G when the pullout signal RS is received from the communication device 10.

Since the projector 30 displays the no-input image GN when the projector 30 receives the pullout signal RS, it is possible for the user to know the fact that the communication device 10 has surely and successfully been pulled out from the PC 20.

The projector 30 is provided with the second storage circuit 32, and the projector 30 includes the step of storing the image packet GP in the stack area SR2 of the second storage circuit 32 when the projector 30 receives the image packet GP from the communication device 10, and the step of erasing the image packet GP stored in the stack area SR2 when the projector 30 receives the pullout signal RS from the communication device 10.

After the user pulls out the USB connector 19 from the PC 20, it is preferable for the projector 30 not to project the image G based on the image data GD. However, when the image packet GP is stored in the second storage circuit 32, the projector 30 may project the image G based on the image packet GP stored in the stack area SR2. Therefore, in the present embodiment, by erasing the image packet GP stored in the stack area SR2, it is possible to prevent the projector 30 from projecting the image G after the user pulls out the USB connector 19 from the PC 20.

2. Modified Examples

Each of the aspects described hereinabove can variously be modified. Specific aspects of modification will hereinafter be illustrated. Tow or more aspects arbitrarily selected from the following illustrations can arbitrarily be combined unless conflicting with each other. It should be noted that in each of the modified examples illustrated hereinafter, regarding the elements substantially the same in operation and function as those in the embodiments, the symbols referred to in the above description are diverted to arbitrarily omit the detailed description of each of such elements.

2.1. First Modified Example

Although in the first embodiment, the detection circuit 18 detects the fact that the USB connector 19 has been pulled out from the PC 20, it is possible for the processing circuit 12 to detect the fact that the USB connector 19 has been pulled out from the PC 20.

Figure 13:
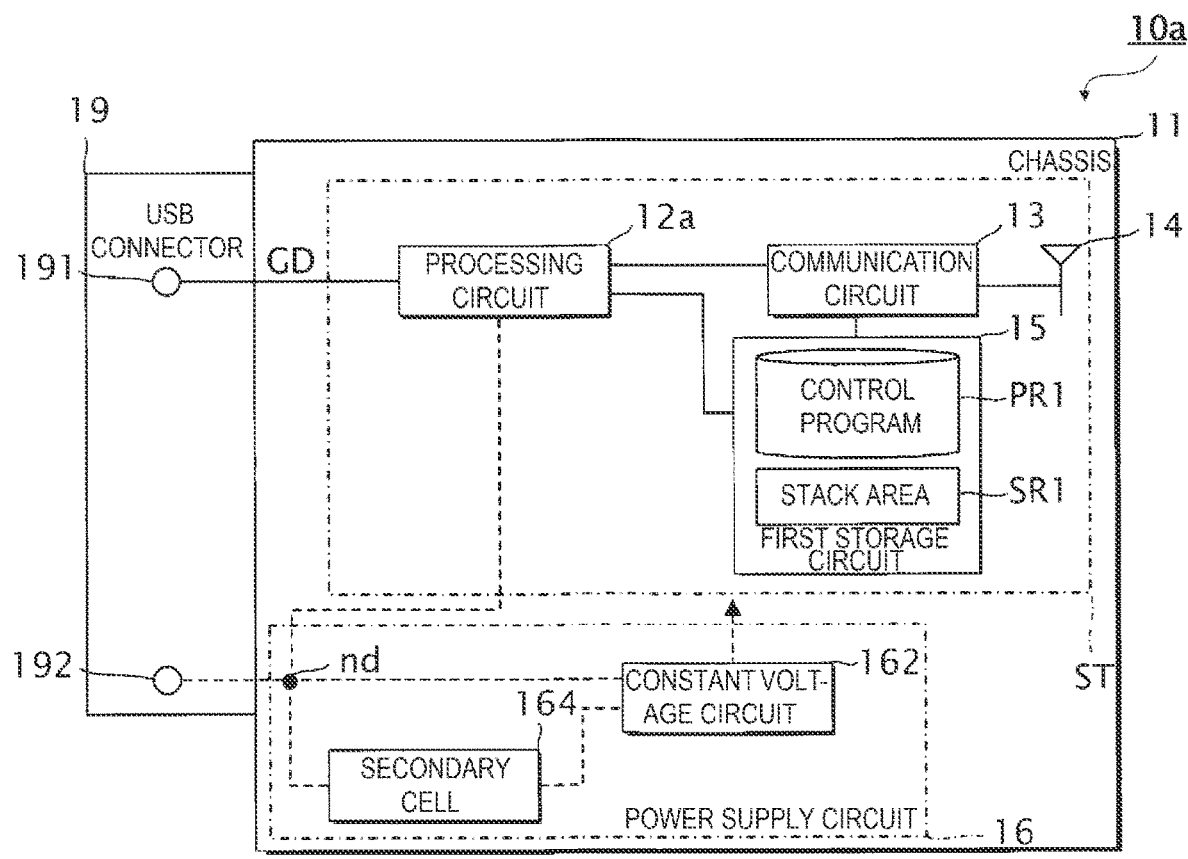
FIG. 13 is a diagram showing an example of a configuration of a communication device 10a according to a first modified example.

FIG. 13 is a diagram showing an example of a configuration of a communication device 10a according to the first modified example. The communication device 10a is different from the communication device 10 in the point that the communication device 10a has a processing circuit 12a instead of the processing circuit 12, but does not have the detection circuit 18. The processing circuit 12a monitors the voltage of the electrical power to be supplied from the PC 20 via the relay node nd. When the USB connector 19 is pulled out from the PC 20, the voltage at the relay node nd becomes 0. When the voltage at the relay node nd lowers, and the voltage having lowered becomes equal or less than a predetermined level, the processing circuit 12a detects an external interrupt representing the fact that the USB connector 19 has been pulled out from the PC 20.

As described hereinabove, according to the first modified example, the USB connector 19 is supplied with the electrical power from the PC 20. The processing circuit 12a monitors the voltage of the electrical power to thereby detect the fact that the USB connector 19 has been pulled out from the PC 20 when the voltage is equal or less than a predetermined level.

According to the first modified example, it is possible to surely detect the fact that the USB connector 19 has been pulled out from the PC 20. Further, the first modified example is not required to have the detection circuit 18 compared to the first embodiment.

2.2. Second Modified Example

The communication system 1 has a single communication device 10 in the first embodiment, but can have a plurality of communication devices 10.

Figure 14:
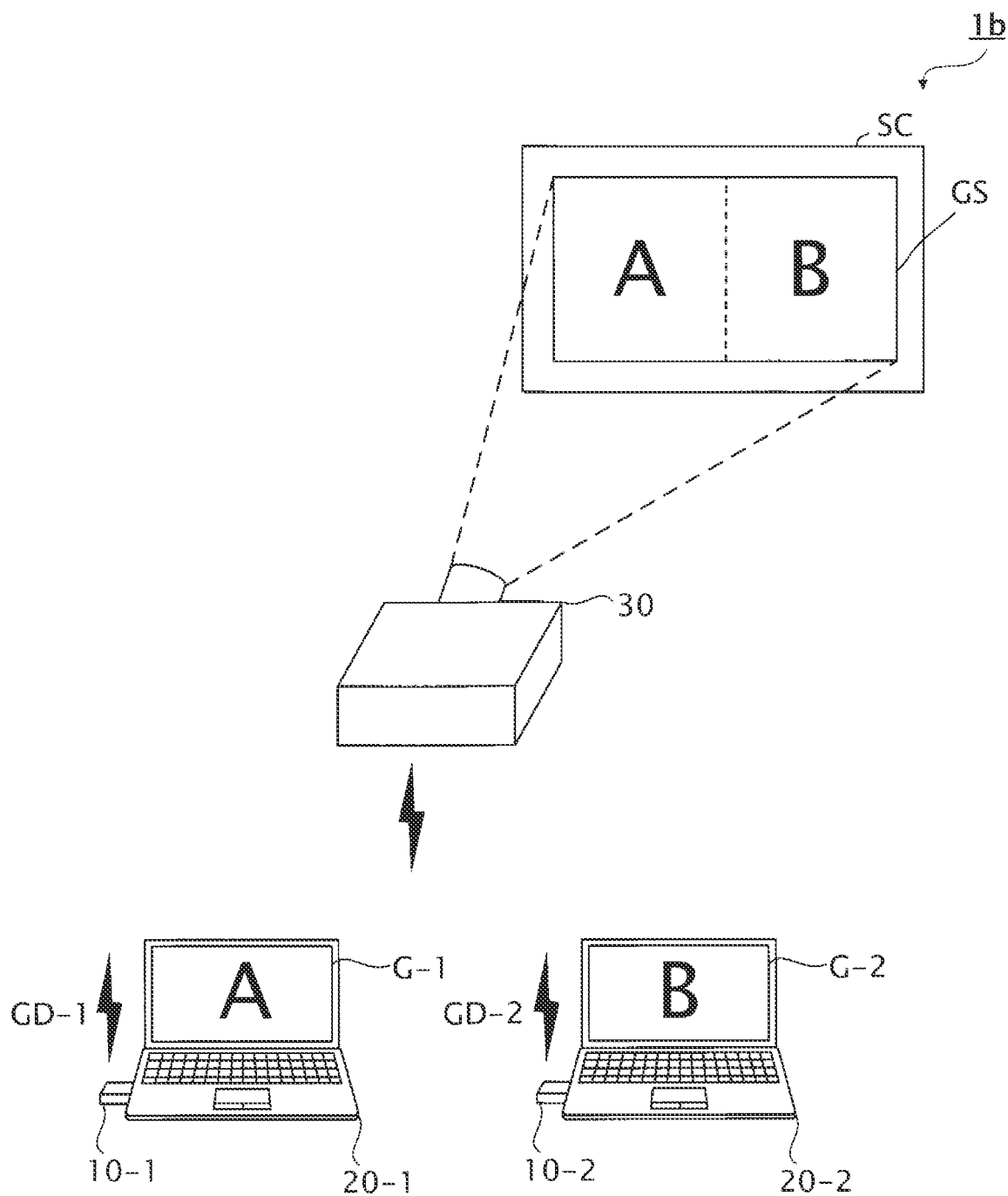
FIG. 14 is a schematic diagram illustrating a communication system 1b according to a second modified example.

FIG. 14 is a schematic diagram illustrating a communication system 1b according to a second modified example. The communication system 1b has a communication device 10-1, a communication device 10-2, a PC 20-1, and a PC 20-2. In the following description, the communication devices 10 is a collective designation of the communication device 10-1 and the communication device 10-2, and the PCs 20 is a collective designation of the PC 20-1 and the PC 20-2. The USB connector 19 for the communication device 10-1 is inserted into the PC 20-1, and the USB connector 19 for the communication device 10-2 is inserted into the PC 20-2.

The projector 30 receives image data GD-1 representing an image G-1 from the PC 20-1, and further, receives image data GD-2 representing an image G-2 from the PC 20-2. The image G-1 includes a character "A" at the center. The image G-2 includes a character "B" at the center. The projector 30 generates composite image data GSD representing a composite image GS in which the image G-1 is arranged at the left side and the image G-2 is arranged at the right side based on the image data GD-1 and the image data GD-2. The projector 30 projects the composite image GS on the projection surface SC based on the composite image data GSD. As described above, the projector 30 can project the composite image GS obtained by combining a plurality of images with each other.

Figure 15:
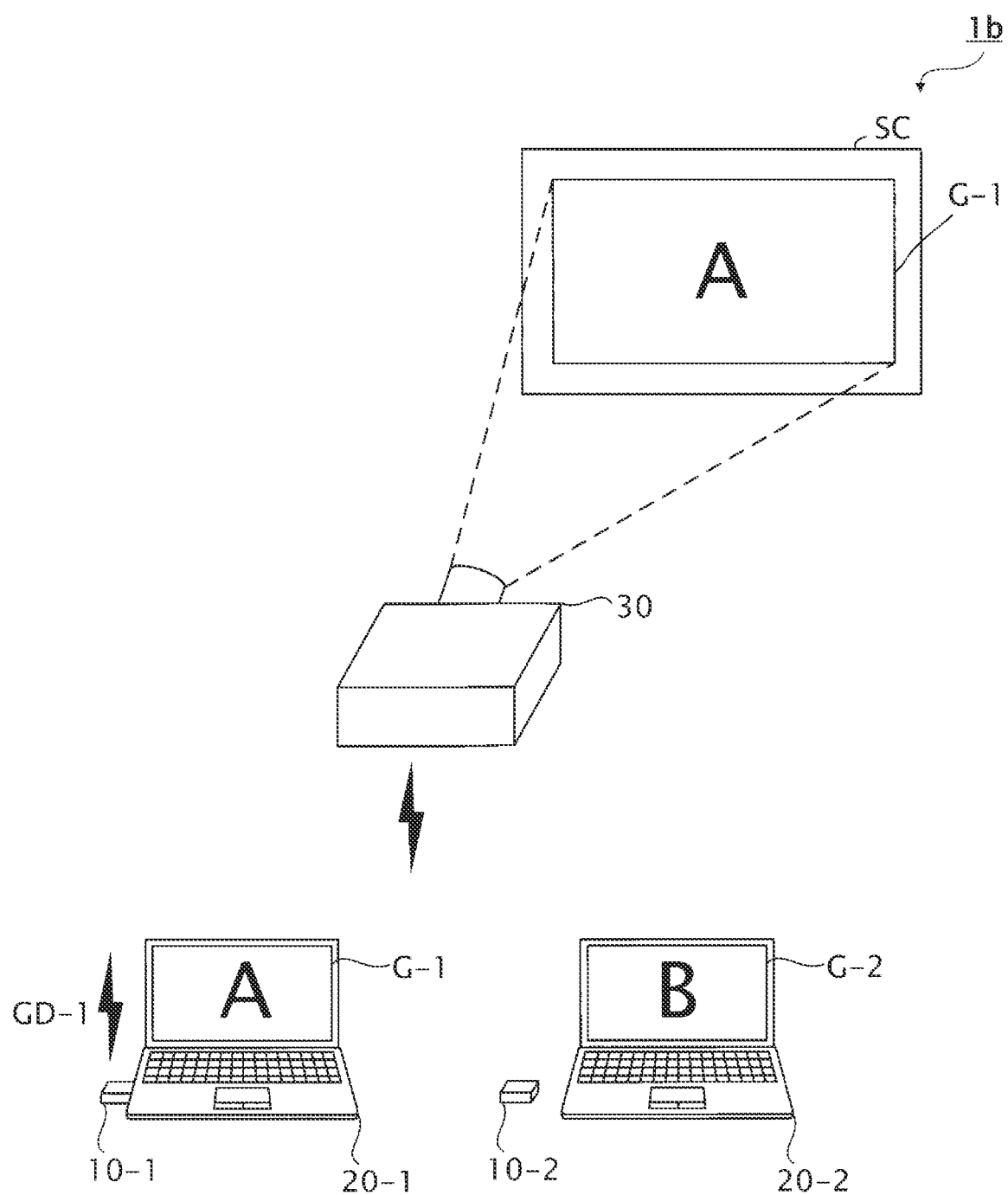
FIG. 15 is a diagram showing a state in which a communication device 10-2 is pulled out from a PC 20-2.

FIG. 15 is a diagram showing a state in which the communication device 10-2 is pulled out from the PC 20-2. When the communication device 10-2 is pulled out from the PC 20-2, the communication device 10-2 transmits the pullout signal RS to the projector 30. When the projector 30 receives the pullout signal RS, the projector 30 stops generating the composite image data GSD, and promptly projects the image G-1 on the projection surface SC. In the second modified example, the composite image GS is an example of the "first image," and the image G-1 is an example of the "second image."

As described above, according to the second modified example, it is possible for the projector 30 to promptly switch from the composite image obtained by combining a plurality of images with each other to a single image.

2.3. Third Modified Example

In each of the aspects described above, the pullout signal RS is the Deauthentication frame, but this is not a limitation. For example, the pullout signal RS can also be a frame having PDU of UDP. PDU of UDP is referred to as a datagram. More particularly, the pullout signal RS in the third modified example is a frame obtained by further encapsulating the IP packet obtained by encapsulating the UDP datagram. The transmission source MAC address and the destination MAC address of the pullout signal RS in the third modified example are the same as those of the pullout signal RS in the first embodiment. The transmission source IP address of the pullout signal RS in the third modified example is the IP address of the communication device 10, and the destination IP address is the IP address of the projector 30.

When the projector 30 receives the pullout signal RS in the third modified example, the cutter 315 determines whether or not the transmission source IP address of the pullout signal RS in the third modified example exists in the session list SL without searching the ARP table AT. When the IP address described above is found out from the session list SL, the cutter 315 executes the cut processing.

According to the third modified example, since it is not required to search the ARP table AT, it is possible for the projector 30 to reduce the processing burden compared to the first embodiment. In contrast, according to the first embodiment, compared to the third modified example, the pullout signal RS does not have the UDP datagram, and accordingly, the burden on the generation and the transmission of the pullout signal RS is reduced, and it is possible to decrease the maximum electrical power which the secondary cell 164 can charge.

2.4. Fourth Modified Example

In each of the aspects described above, the communication circuit 13 transmits the pullout signal RS to the projector 30 with unicasting, but this is not a limitation. For example, when the projector 30 exists alone in the communication system 1, it is possible for the communication circuit 13 to transmit the pullout signal RS to all of the devices located in the communication system 1 with broadcasting. The destination MAC address of the pullout signal RS in the fourth modified example is "FF-FF-FF-FF-FF-FF."

2.5. Fifth Modified Example

The PC 20 transmits the image data GD to the communication device 10 in each of the aspects described above, but can also transmit the image packet GP including the image data GD to the communication device 10.

2.6. Sixth Modified Example

When the processing circuit 12 detects the fact that the USB connector 19 has been pulled out from the PC 20, the processing circuit 12 erases the image packet GP stored in the stack area SR1 in each of the aspects described above, but is not required to erase the image packet GP stored in the stack area SR1.

2.7. Seventh Modified Example

In each of the aspects described above, the projector 30 displays the no-input image GN when the projector 30 receives the pullout signal RS from the communication device 10, but this is not a limitation. For example, it is possible for the projector 30 to stop the projection itself when the projector 30 receives the pullout signal RS from the communication device 10.

2.8. Eighth Modified Example

When the projector 30 receives the pullout signal RS from the communication device 10, the projector 30 erases the image packet GP stored in the stack area SR2 in each of the aspects described above, but can project the image G based on the image packet GP stored in the stack area SR2 without erasing the image packet GP stored in the stack area SR2.

2.9. Ninth Modified Example

Although the USB connector 19 of the communication device 10 is directly inserted into the PC 20 in each of the aspects described above, it is possible to adopt a configuration in which a USB hub is inserted into the PC 20, and the communication device 10 is inserted into the USB hub. The communication device 10 is supplied with the electrical power from the PC 20 via the USB hub. In the fifth modified example, the USB hub is an example of the "first device."

2.10. Tenth Modified Example

In each of the aspects described above, the USB connector 19 is an example of the "connector," but the "connector" is not limited to the USB connector 19. For example, the "connector" can be an IEEE 1394 connector.

2.11. Eleventh Modified Example

In the projection device 37 in each of the aspects described above, the liquid crystal light valves 372 are used as the light modulation device, but the light modulation device is not limited to the liquid crystal light valves 372, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices, or a system using a single digital mirror device. When just one liquid crystal panel or digital mirror device is used as the light modulation device, the members corresponding to the color separation optical system and the color combining optical system are unnecessary. Further, besides the liquid crystal panel or the digital mirror device, any configurations capable of modulating the light emitted by the light source can be adopted as the light modulation device.

2.12. Twelfth Modified Example

In each of the aspects described above, the projector 30 is an example of the "display device," but this is not a limitation. For example, as another example of the display device, there is cited an organic EL display or a liquid crystal display. The term EL is an abbreviation for Electro Luminescence.

2.13. Thirteenth Modified Example

In each of the aspects described above, the display device such as the projector 30 is an example of the "second device," but the second device is not limited to the projector 30. For example, the second device can be an acoustic device for emitting a sound. The PC 20 transmits sound data representing a sound to the acoustic device via the communication device 10. When the acoustic device receives the pullout signal RS from the communication device 10, the acoustic device promptly executes processing of stopping emitting the sound as the processing corresponding to the pullout signal RS.

2.14. Fourteenth Modified Example

In each of the aspects described above, the communication device 10 and the projector 30 perform the wireless communication with the wireless LAN, but this is not a limitation. For example, it is possible for the communication device 10 and the projector 30 to perform the wireless communication with Bluetooth instead of the wireless LAN. Bluetooth is a registered trademark.

2.15. Fifteenth Modified Example

In each of the aspects described above, the PC 20 is an example of the "first device," but the first device is not limited to the PC 20. For example, the first device can also be a digital tuner, a Blu-ray recorder, a digital camera, a gaming machine, and so on.

2.16. Sixteenth Modified Example

Further, in each of the aspects described above, some or all of the elements realized by the processing circuit 12 executing the control program PR1 can be realized by hardware using an electronic circuit such as an FPGA or an ASIC, or can also be realized by a cooperative operation of the software and the hardware. The term FPGA is an abbreviation for Field Programmable Gate Array. The term ASIC is an abbreviation for Application Specific IC. The same applies to the processing circuit 21 and the processing circuit 31.

What is claimed is:

1. A communication device comprising:
   a connector which is inserted into a first device;
   a communication circuit which performs wireless communication with a second device;
   a processing circuit programmed to execute
      communicating with the first device via the connector,
      generating a first signal representing that the connector is pulled out from the first device when the processing circuit detects that the connector is pulled out from the first device, and
      transmitting the first signal to the second device by controlling the communication circuit; and
   a first storage circuit which stores communication data based on data obtained from the first device via the connector, wherein
   the processing circuit is programmed to erase the communication data stored in the first storage circuit when the processing circuit detects that the connector is pulled out.

2. The communication device according to claim 1, further comprising:
   a detection circuit which outputs a detection signal when a voltage of electrical power supplied form the first device via the connector is equal or less than a level by monitoring the voltage, wherein
   the processing circuit is programmed to detect that the connector is pulled out from the first device when the processing circuit receives the detection signal.

3. The communication device according to claim 1, wherein
   the connector is supplied with electrical power from the first device, and
   the processing circuit is programmed to detect that the connector is pulled out from the first device when a voltage of the electrical power is equal or less than a level by monitoring the voltage.

4. The communication device according to claim 1, further comprising:
   a secondary cell which supplies electrical power to the communication circuit and the processing circuit when the connector is pulled out.

5. A communication system comprising:
   a first device;
   a communication device including
      a connector which is inserted into the first device,
      a communication circuit which performs wireless communication, and
      a processing circuit programmed to execute
         communicating with the first device via the connector,
         generating a first signal representing that the connector is pulled out from the first device when the processing circuit detects that the connector is pulled out from the first device, and
         transmitting the first signal by controlling the communication circuit; and
   a second device which executes processing corresponding to the first signal when the second device receives the first signal, wherein
   the second device is a display device comprising one or more processors;
   the second device one or more processors are programmed to execute
      displaying, when the second device receives image data from the communication device, a first image based on the image data, and
      displaying a second image different from the first image when the second device receives the first signal from the communication device:
   the display device includes a second storage circuit; and
   the display device one or more processors are programmed to execute
      storing the image data in the second storage circuit when the display device receives the image data from the communication device, and
      erasing the image data stored in the second storage circuit when the display device receives the first signal from the communication device.

* * * * *